United States Patent
Fujimoto et al.

(10) Patent No.: US 6,501,493 B2
(45) Date of Patent: Dec. 31, 2002

(54) IMAGE FORMING APPARATUS AND METHOD WITH VARIABLE PHASE MASKING PERIOD FOR BEAM DETECT SIGNAL

(75) Inventors: Akihiro Fujimoto, Kanagawa; Hideaki Hirasawa, Shizuoka, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/875,984

(22) Filed: Jun. 8, 2001

(65) Prior Publication Data

US 2002/0021345 A1 Feb. 21, 2002

(30) Foreign Application Priority Data

Jun. 8, 2000 (JP) ........................................ 2000-172131

(51) Int. Cl.$^7$ .............................................. G03G 15/01
(52) U.S. Cl. ........................ 347/116; 347/235; 347/250
(58) Field of Search ................................. 347/116, 234, 347/235, 248, 247, 250; 399/45, 68

(56) References Cited

U.S. PATENT DOCUMENTS 6,052,143 A * 4/2000 Yoshino et al. ............. 347/250
6,188,419 B1 * 2/2001 Katamoto et al. .......... 347/115
6,222,611 B1 * 4/2001 Asada ........................ 250/235
6,262,759 B1 * 7/2001 Akiyama et al. ........... 347/235

FOREIGN PATENT DOCUMENTS

JP          4-247418       *   9/1992

OTHER PUBLICATIONS

U.S. patent Application Series No. 09/489,945, filed Jan. 24, 2000 (GAU 2731).

* cited by examiner

*Primary Examiner*—Joan Pendegrass
(74) *Attorney, Agent, or Firm*—Fitzpatrick, Cella, Harper & Scinto

(57) ABSTRACT

An image forming apparatus for accurately correcting misregister between images and effecting image formation is an apparatus for forming images by a plurality of image forming portions each having an image bearing member and a scanner unit for deflecting and scanning a light beam in conformity with an image signal and writing an image onto the image bearing member, and has an image signal outputting portion for outputting the image signal in conformity with a partly masked horizontal sync signal, and is designed to change the mask timing of the horizontal sync signal in conformity with the misregister amount among the images and to change the phase of a rotation reference signal for the control of the rotation of the scanner unit.

23 Claims, 10 Drawing Sheets

IMAGE FORMING APPARATUS AND METHOD WITH VARIABLE PHASE MASKING PERIOD FOR BEAM DETECT SIGNAL

BACKGROUND OF THE INVENTION

1. Field of the Invention

This Invention relates to an image forming apparatus, and particularly to an apparatus for forming images by a plurality of image forming portions.

2. Related Background Art

There is known an apparatus for forming images of different colors by a plurality of Image forming units each having a laser scanner, a photosensitive drum, etc., and superimposing and transferring them onto a recording sheet to thereby obtain a color image.

In the apparatus of this kind, to accurately superimpose and transfer the images formed by the respective image forming units onto a recording sheet, the image formation starting positions in the main scanning direction and the sub-scanning direction of each image on each photosensitive drum must be adjusted accurately. For this purpose, there is known the technique of transferring a register mark for the correction of misregister onto a transferring belt, and detecting and correcting the misregister between the images of respective colors on the basis of the result of the reading of the register mark.

Regarding the misregister in the main scanning direction, the writing-out timing of each image is adjusted in each image forming unit on the basis of the horizontal sync signal of each light beam, whereby the misregister between the images can be corrected even if the surface phases of respective scanner motors are not coincident with one another.

Also, regarding the misregister in the sub-scanning direction, rotation reference signals to respective scanner motor controlling portions are made to have the same cycle period and the rotating operations of the respective scanner motors are controlled, whereby the rotational speeds of the scanner motors can be made coincident with one another. Also, by a phase difference being given between the rotation reference signals, the surface phase of each scanner motor can be kept at a predetermined phase. By using these techniques, the writing-out timing of less than one (1) line in the sub-scanning direction can be corrected to thereby correct color misregister.

Generally, an image forming apparatus using the electrophotographic process has a fixing device for passing a printing sheet bearing toner images thereon through the pressure contact portion between a pair of fixing rollers, and mixing and fixing the superimposed toner images of a plurality of colors by heat and pressure.

For example, when printing is to be effected on a transparent sheet for projection (OHT), to improve the transmitting property thereof, it becomes important for toner images to be sufficiently melted and mixed with one another, and for the surface of the sheet to be smooth. For this purpose, it becomes necessary to reduce the fixing speed and supply sufficient heat to the toners.

As means for realizing a printing operation in which the fixing speed is reduced, there is a method of reducing the speed of not only the charging, developing and fixing processes directly concerned with the speed in the sub-scanning direction (the sheet conveying direction) but also the exposing process, with the fact that the charging, exposing and development of a pertinent page are effected in parallel with one another taken into account. For that purpose, when in the in-line type apparatus having the plurality of image forming units as previously described, the fixing speed is 1/n, it would occur to mind to effect exposure based on image data only once per n times of scanning of the scanner motor.

However, when as previously described, the exposing process based on image data is effected only once per n times of scanning of the scanner motor, even if an attempt is made to control the surface phase of the scanner motor to thereby correct the misregister in the sub-scanning direction, the range within which a phase difference can be given to the surface phase of the scanner motor to thereby correct the misregister is limited to 1/n line or less.

This state will now be described with reference to FIG. 13 of the accompanying drawings.

FIG. 13 shows the state of images formed when exposure based on image data was effected only once per two times of scanning of the scanner motor.

In FIG. 13, 1301K, 1305K and 1309K designate black images formed by one time of exposure per two times of scanning of the scanner motor, and 1301Y, 1305Y and 1309Y denote yellow images formed by one time of exposure per two times of the scanner motor. 1301K, 1305K, 1309K and 1301Y, 1305Y, 1309Y deviate by 1311 in the sub-scanning direction from each other. Also, broken lines indicated by 1303K, 1303Y, 1307K and 1307Y indicate the states of black and yellow images which are thinned by one time of exposure per two times of scanning of the scanner motor and are actually not formed.

When as shown in FIG. 13, the deviation 1311 is one time of scanning of the scanner motor, i.e., one (1) line or less, the phase of the scanner motor is quickened in conformity with the deviation 1311 when the yellow images 1301Y, 1305Y and 1309Y are formed with the black images as the reference, whereby misregister can be corrected.

On the other hand, when as shown in FIG. 14 of the accompanying drawings, the misregister amount in the sub-scanning direction between the black image and the yellow image exceeds one time of scanning of the scanner motor, i.e., one (1) line, as indicated by 1313, the amount which can be corrected with the phase of the scanner motor changed during the formation of the yellow images 1301Y, 1305Y and 1309Y is 1315 indicated in FIG. 14, and the difference 1317 between the deviation 1313 and the deviation 1315, i.e., misregister of one (1) line corresponding to one time of scanning of the scanner motor, cannot be corrected.

That is, when between the actually formed images 1301K, 1305K, 1309K and 1301Y, 1305Y, 1309Y, there is misregister exceeding ½ line, misregister of ½ line will remain even if the rotational phase of the scanner motor is corrected.

SUMMARY OF THE INVENTION

It is an object of the present invention to solve the above-noted problems.

It is another object of the present invention to obtain images of high definition.

It is still another object of the present invention to correct the misregister of images accurately and effect image formation.

The image forming apparatus of the present invention is provided with:

a plurality of image forming means juxtaposed with one another and each having an image bearing member, light beam generating means for generating a light beam modulated in conformity with an image signal, a rotary polygon mirror for deflecting and scanning the light beam generated by the light beam generating means and writing an image onto the image bearing member, and light beam detecting means for detecting the light beam deflected and scanned by the rotary polygon mirror at a predetermined position on a scanning route;

sync signal generating means for generating a horizontal sync signal based on a detection signal from the light beam detecting means;

mask means for masking and outputting the is horizontal sync signal;

image signal outputting means for outputting the image signal to the light beam generating means in the plurality of image forming means in response to the horizontal sync signal outputted from the mask means;

a plurality of rotation controlling means for rotatively driving the rotary polygon mirrors in the plurality of image forming means based on light beam detection signals from the light beam detecting means and a rotation reference signal:

reference signal generating means for generating the rotation reference signal to the plurality of rotation controlling means; and control means for changing the phase of the rotation reference signal and the mask timing by the mask means based on the misregister amount among images formed by the plurality of image forming means to thereby correct the misregister amount among the images.

Other objects, constructions and effects of the present invention will become apparent from the following detailed description and the accompanying drawings.

DESCRIPTION OF THE PREFERRED EMBODIMENTS

Some embodiments of the present invention will hereinafter be described: in detail with reference to the drawings. In the present embodiment, description will be made of a case where the present invention is applied to a color image forming apparatus.

Figure 1:
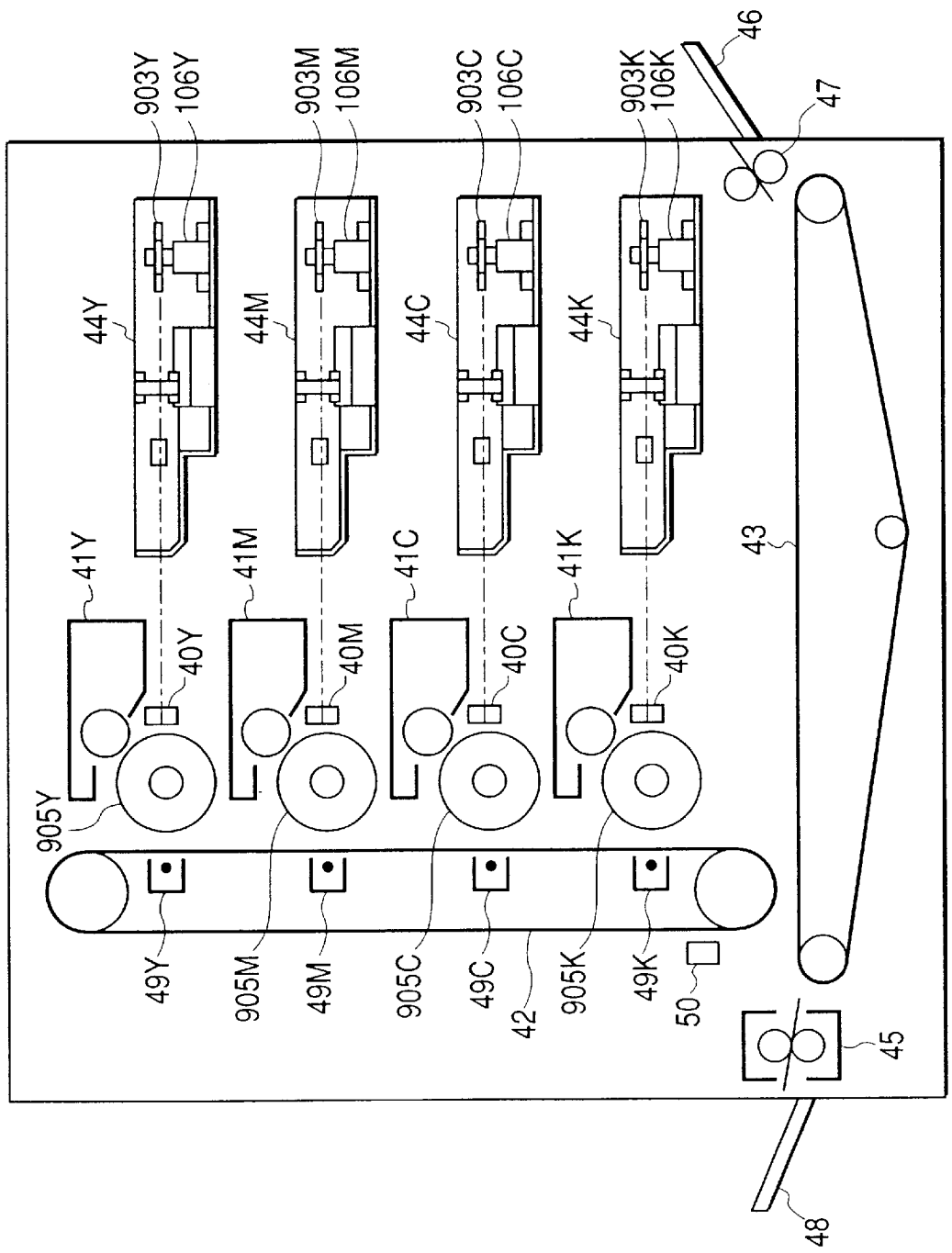
FIG. 1 shows the construction of an image forming apparatus to which the present invention is applied.

FIG. 1 shows the construction of an image forming apparatus according to the present embodiment.

In FIG. 1, the reference characters 41Y, 41M, 41C and 41K designate yellow (Y), magenta (M), cyan (C) and black (K) drum unit cartridges (drum units) comprising photosensitive members 905Y, 905M, 905C and 905K (collectively designated by a reference numeral 905) for forming latent images thereon and developing devices made integral therewith for developing the latent images on the photosensitive members by predetermined developers. These respective color drum units 41Y, 41M, 41C and 41K are detachably mounted on the main body of the image forming apparatus independently of one another.

Figure 2:
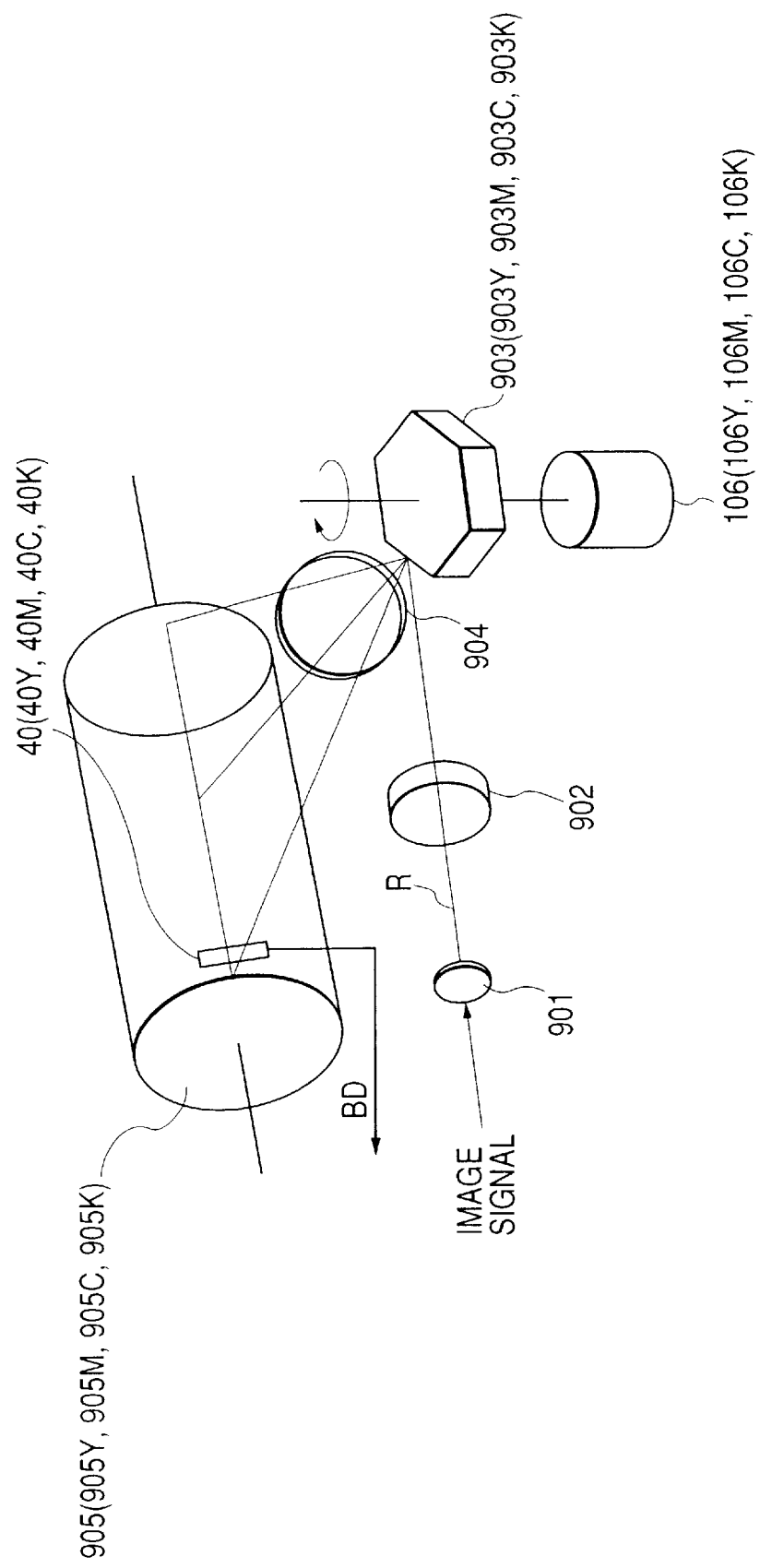
FIG. 2 shows an example of the construction of a scanner unit in the apparatus of FIG. 1.

The reference characters 44Y, 44M, 44C and 44K denote yellow, magenta, cyan and black scanner units for causing laser beams emitted by laser ON/OFF signals converted by a printer engine on the basis of video data of respective colors sent from a printer controller 1001 which will be described later to be scanned by polygon mirrors 903Y, 903M, 903C and 903K (collectively designated by a reference numeral 903). and causing the latent images to be formed on the respective photosensitive members of the drum units 41Y, 41M, 41C and 41K. The detailed constructions of the scanner units 44Y, 44M, 44C, 44K and the drum units 41Y, 41M, 41C, 41K are shown in FIG. 2.

The reference characters 40Y, 40M, 40C and 40K (collectively designated by a reference numeral 40) designate light beam detectors (BD) such as yellow, magenta, cyan and black photosensors disposed at predetermined locations near the photosensitive members of the drum units 41Y, 41M, 41C and 41K for detecting the laser beams applied by the scanner units 44Y, 44M, 44C and 44K of the respective colors, and outputting BD signals.

The reference numeral 42 denotes an intermediate transfer belt adapted to be charged by chargers 49Y, 49M, 49C and 49K to thereby once primary-transfer the visualized images developed by the drum units and form a multilayer image, and transfer it to a transferring material conveyed by a conveying belt 43.

The conveying belt 43 is a belt for secondary-transferring the multilayer transferred image formed by the intermediate transfer belt 42 to the transferring material fed from a feed portion 46 through feed rollers 47, and thereafter conveying the transferring material to a fixing portion 45.

The reference numeral 50 designates a sensor for detecting a mark for the detection of misregister formed on the intermediate transfer belt 42. The fixing portion 45 fixes the images transferred onto the recording material conveyed by the conveying belt 43, and delivers the recording material to a delivery portion 48.

FIG. 2 schematically shows the constructions of the scanner unit 44 (44Y, 44M, 44C, 44K) and drum unit 41 (41Y, 41M, 41C, 41K) shown in FIG. 1, and in FIG. 2. the same members as those in FIG. 1 are given the same reference characters. The scanner units and drum units of the respective colors are similar in construction.

In FIG. 2, the reference numeral 901 denotes a laser diode which generates a light beam R modulated in conformity with video data, not shown. The reference numeral 902 designates a collimator lens which collimates the laser beam R generated by the laser diode 901. The reference numeral 903 (903Y, 903M, 903C, 903K) denotes a rotary polygon mirror which is rotatively driven by a scanner motor 106 (106Y, 106M, 106C, 106K) and reflects the laser beam R applied thereto through the collimator lens 902, and scans the surface of a drum-shaped photosensitive member 905 through an fΘ lens 904 for correcting the scanning speed.

The scanner unit 44 is comprised of the laser diode 901, the collimator lens 902, the fΘ lens 904, the rotary polygon mirror 903, the scanner motor 106, and so on.

Also, the drum unit 41 is comprised of the photosensitive member 905, the light beam detector 40, a developing device (not shown), and so on.

The operation of each portion will now be described.

The laser beam R is generated by the laser diode 901, and this laser beam R is collimated by the collimator lens 902, and thereafter is applied to the rotary polygon mirror 903. The laser beam R reflected by the rotary polygon mirror 903 is applied to the photosensitive member 905 through the fΘ lens 904 for correcting the scanning speed, and scans the surface of the photosensitive member 905 by the rotation of the rotary polygon mirror 903.

At this time, the laser beam R is modulated by video data synchronized with the BD signal from the BD 40 disposed near the photosensitive member 905 and therefore, a latent image corresponding to the video data is formed on the photosensitive member 905.

Figure 3:
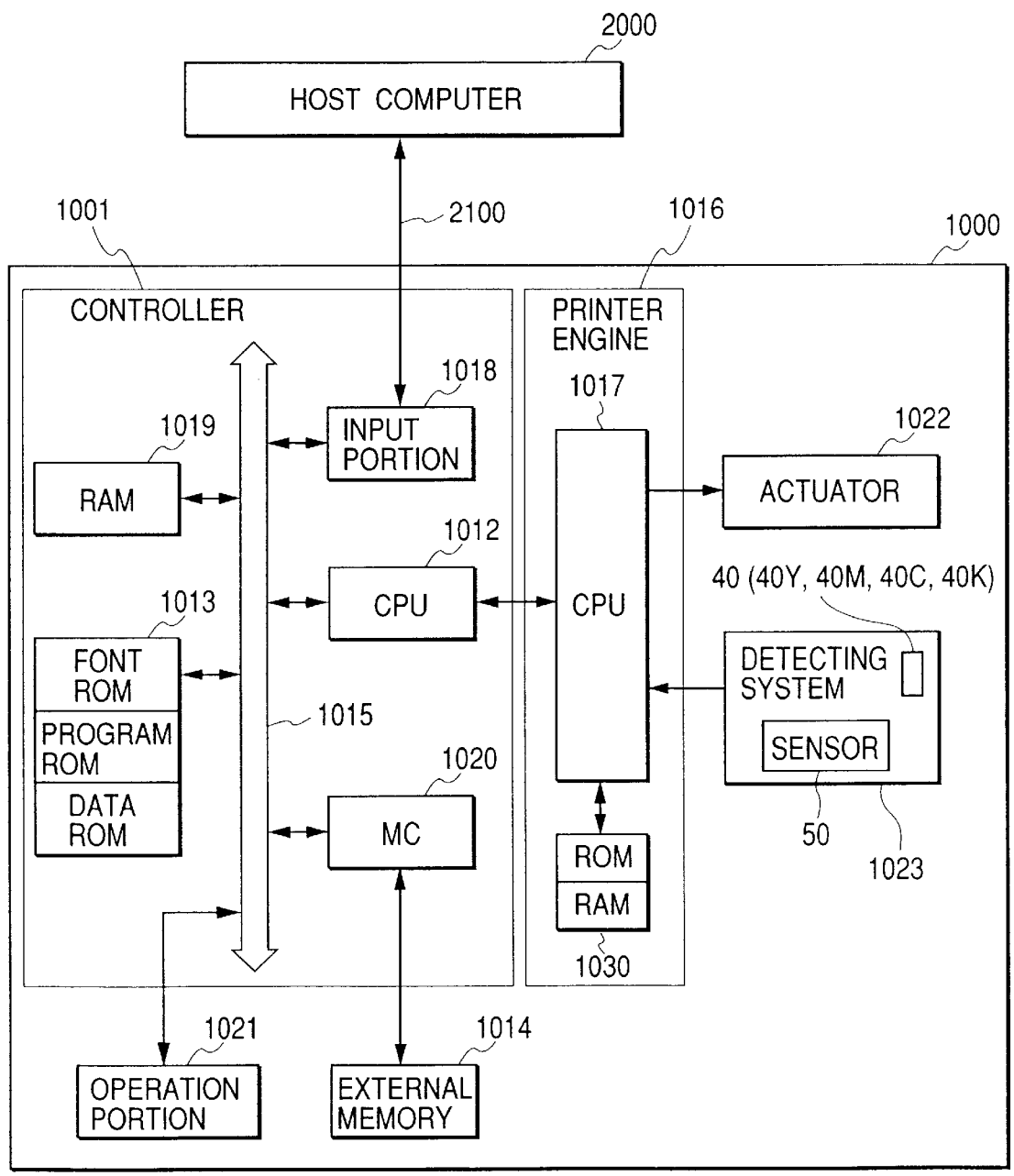
FIG. 3 is a block diagram showing the internal construction of the apparatus of FIG. 1.

FIG. 3 Is a block diagram showing the construction of the essential portions of the image forming apparatus of FIG. 1. and in FIG. 3, the same members as those in FIG. 1 are given the same reference numerals.

In the image forming apparatus 1000, the reference numeral 1001 designates a controller which generally controls the access to various devices connected to a system bus 1015 on the basis of a control program or the like stored in the program ROM of a ROM 1013 by a CPU 1012 or a control program or the like stored in an external memory 1014 such as a hard disc, a floppy disc or a magneto-optical disc, and outputs video data as output information to a printer engine 1016. Also, front data or the like used when output data is to be produced is stored in the font ROM of the ROM 1013. Further, information or the like utilized on a host computer 2000 is stored in the data ROM of the ROM 1013 for a printer which is not provided with the external memory 1014 such as a hard disc.

The CPU 1012 is capable of effecting bilateral communication process with the host computer 2000 through an input portion 1018 and an interface 2100, and is designed to be capable of informing the host computer 2000 of the information or the like in the image forming apparatus 1000. The reference numeral 1019 denotes a RAM which functions as the main memory, the work area, etc. of the CPU 1012, and is designed to be capable of expanding the memory capacity by an option RAM connected to an expanded board, not shown. Also, the CPU 1012 in the controller 1001 and a CPU 1017 in the printer engine 1016 have a timer therein and can count time.

Also, the RAM 1019 is used as an output information evolving area, an environment data storing area, a non-volatile RAM, and so on. The aforedescribed external memory 1014 such as a hard disc or an IC card has its access controlled by a memory controller (MC) 1020. The external memory 1014 is connected as option and stores therein font data, an emulation program, form data, etc. The reference numeral 1021 designates an operation portion on which there are disposed switches for scanning and various kinds of setting, an LED indicator, an LCD indicator, etc.

The number of the aforedescribed external memory 1014 is not limited to one, but is at least one, and it is designed to permit a plurality of external memories storing therein, In addition to a contained font, an option card and a program for interpreting printer control languages differing in language system to be connected thereto. Also, it may be provided with a non-volatile RAM, not shown, so as to store therein various kinds of setting information from the operation portion 1021.

Further, the printer engine 1016 has a CPU 1017 for operating an actuator 1022 at predetermined timing to print the video data sent from the CPU 1012 in the controller 1001, and also feeding back various signals from a detecting system 1023 (including the sensor 50 and the light beam detectors 40Y, 40M, 40C, 40K) introduced during the operation to the operation and effecting control, and a ROM/RAM 1030 for temporarily storing therein various control programs executed by this CPU 1017, the output timing of various signals, the image data of a mark for detecting misregister, the writing-out timing data of the magenta, cyan and black latent images, and the data outputted from the detecting system 1023.

Also, the CPU 1017 forms image data of the respective colors on the intermediate transfer belt 42 on the basis of the mark image data stored in the ROM/RAM 1030 to correct the misregister among the images of the respective colors, and reads them by the sensor 50. On the basis of the result of this reading, it calculates the misregister amounts among the images of the respective colors.

Figure 4:
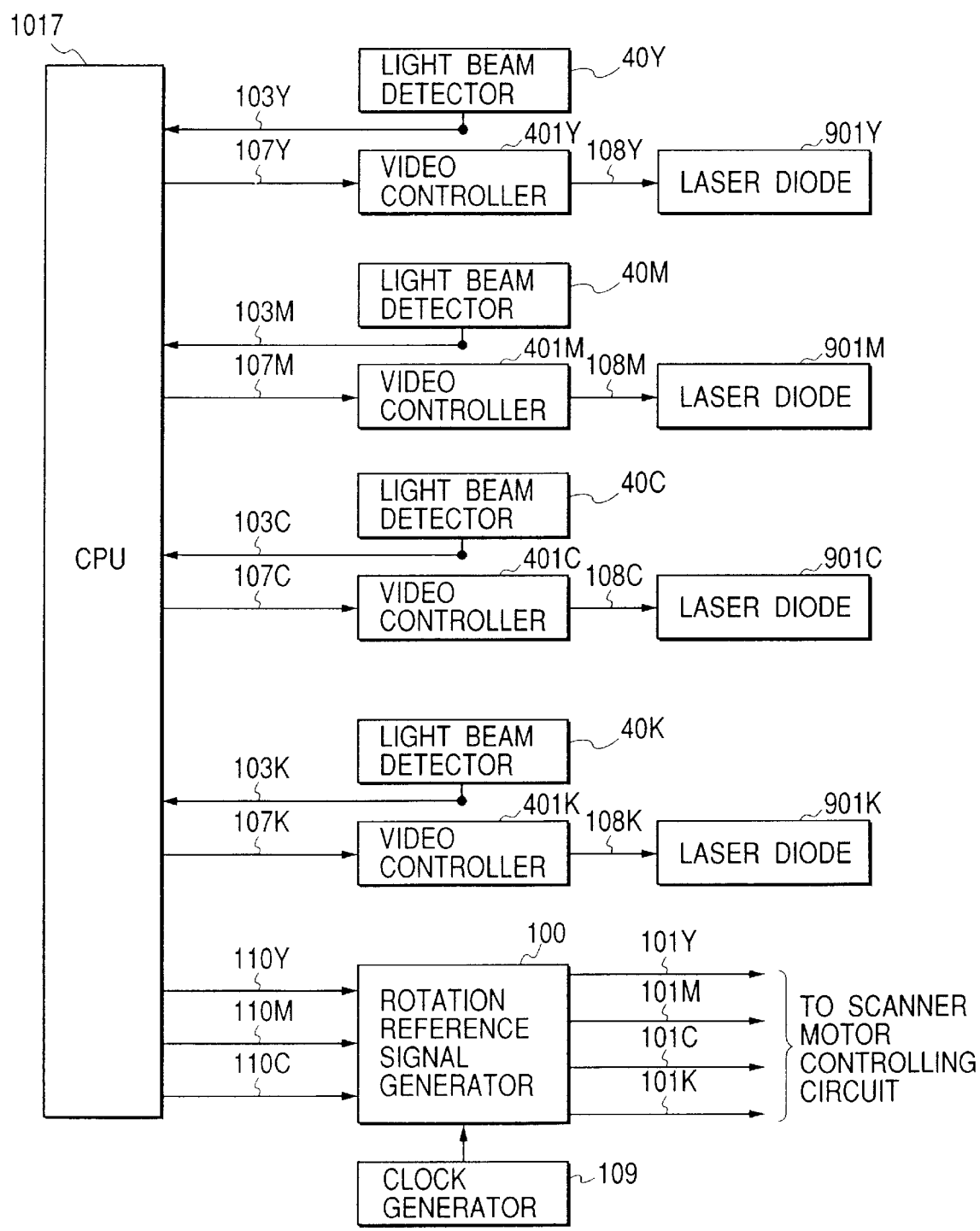
FIG. 4 shows the construction of the essential portions of the printer engine portion of the apparatus of FIG. 3.

Here, in the ordinary image forming mode wherein an image is formed at a first image forming speed, that is, when exposure is effected each time the scanning by the rotary polygon mirror 903 is effected, regarding a misregister amount exceeding one (1) line, on the basis of the measured misregister amount, the CPU 1017 controls the generation timing of each color TOP signal (vertical sync signal) to respective color video controllers 401Y, 401M, 401C and 401K (collectively designated by a reference numeral 401) shown in FIG. 4 which will be described later to the scanning line unit.

Specifically, the CPU 1017 stores the writing-out timing data of Y, M, C and K latent images (the number of sub-scanning lines delayed among the respective colors) in the ROM/RAM 1030 on the basis of the calculated misregister amounts among the images of the respective colors, and controls the generation timing of the TOP signal to the respective color video controllers 401Y, 401M, 401C and 401K of FIG. 4 on the basis of the stored respective color latent image writing-out timing data.

Figure 5:
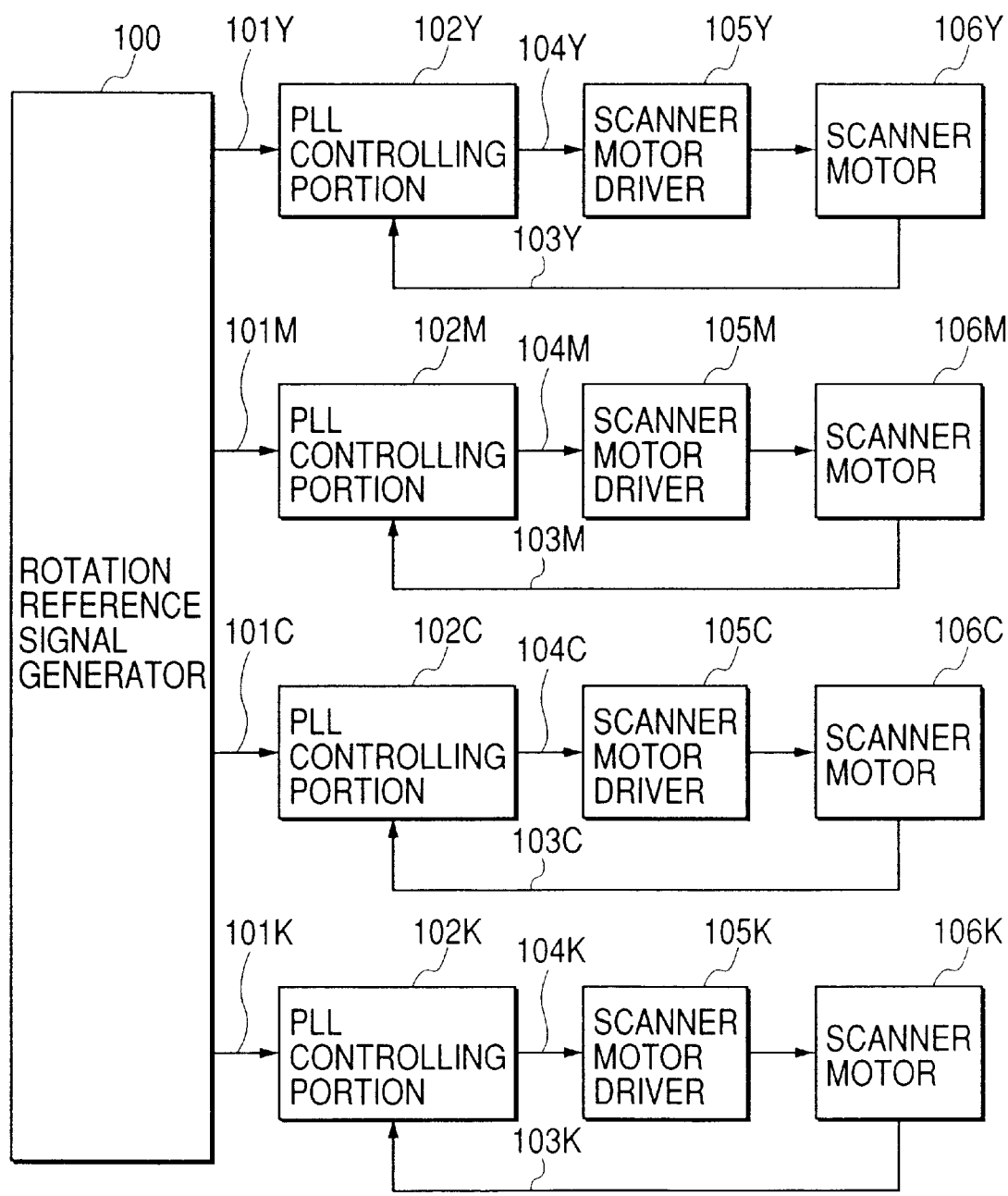
FIG. 5 shows the construction of a scanner motor controlling circuit.

On the other hand, regarding the misregister amount less than one (1) line, the CPU 1017 controls the phases of scanner rotation reference signals 101Y, 101M, 101C and 101K generated by a rotation reference signal generator 100 shown in FIGS. 4 and 5, on the basis of the result of the calculation of the misregister amounts, and also outputs a horizontal sync signal to the respective color video controllers 401 in conformity with respective color BD signals 103 (103Y, 103M, 103C, 103K) to thereby correct the misregister amount less than one (1) line in the sub-scanning direction. Also, in the low speed mode wherein as will be described later, an image is formed at a second image forming speed lower than the first image forming speed, that is, when exposure is effected only once per n times of scanning of the rotary polygon mirror 903 of the scanner unit 44, the BD signal 103 obtained from each color BD 40 is masked at suitable timing and is outputted to each color video controller 401.

FIG. 4 is a block diagram showing the construction of the essential portions of the printer engine 1016 of FIG. 3, and in FIG. 4, the same members as those in FIGS. 1 to 3 are given the same reference characters.

In FIG. 4, the reference characters 401Y, 401M, 401C and 401K denote yellow, magenta, cyan and black video controllers which receive as inputs the respective color BD signals 103 outputted from the respective color light beam detectors 40Y, 40M, 40C and 40K and respective color TOP signals 107 (107Y, 107M, 107C, 107K) outputted from the CPU 1017. and output respective color video data 108 (108Y, 108M, 108C, 108K) to the laser diode 901 in synchronism with the BD signals after the TOP signals of the corresponding colors have been inputted.

Also, the rotation reference signal generator 100 outputs a rotation reference signal 101K for black on the basis of a clock from a clock generator 109, and also outputs rotation reference signals 101Y, 101M and 101C for yellow, magenta and cyan to a scanner motor controlling circuit in accordance with control signals 110Y, 110M and 110C from the CPU 1017.

FIG. 5 is a block diagram showing the construction of the scanner motor controlling circuit in the printer engine 1016 of FIG. 3.

In FIG. 5, the reference numeral 100 designates the rotation reference signal generator shown In FIG. 4, which generates independent rotation controlling signals 101Y, 101M, 101C and 101K to the yellow, magenta, cyan and black scanner units on the basis of the misregister amounts among the respective colors detected as previously described.

The rotation reference signals 101Y, 101M, 101C and 101K have the same cycle period, but have their phases controllable independently of one another to correct the misregister less than one (1) line.

The reference characters 102Y, 102M, 102C and 102K denote PLL controlling portions provided independently for the respective colors Y, M, C and K, and these PLL controlling portions 102Y, 102M, 102C and 102K phase compare the rotation reference signals 101Y, 101M, 101C and 101K and the BD signals 103Y, 103M, 103C and 103K from the BD's 40 in the respective scanner units 44 and as the result, output control signals 104Y, 104M, 104C and 104K to scanner motor drivers 105Y, 105M, 105C and 105K so that the scanner motor drivers 105Y, 105M, 105C and 105K may be phase-synchronized with the rotation reference signals 101Y, 101M, 101C and 101K, respectively, to thereby control the rotating operation of scanner motors 106 (106Y, 106M, 106C, 106K).

Description will now be made of the controlling operation by the present embodiment for the image formation timing during the low speed mode.

Figure 6:
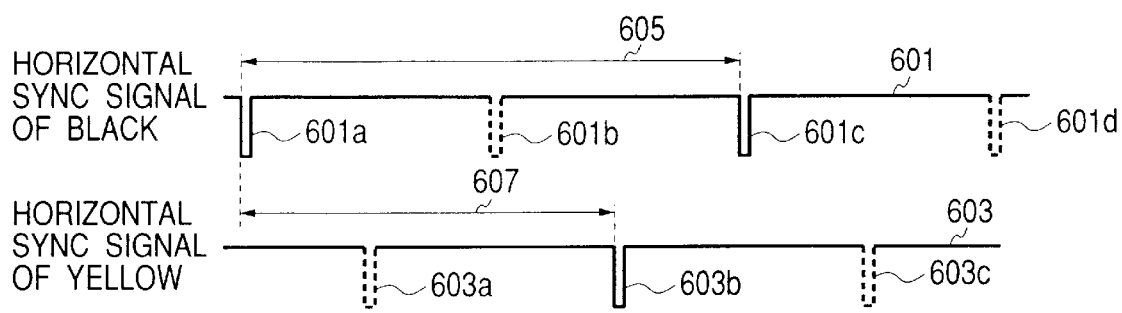
FIG. 6 is a timing chart for illustrating the operation of the circuit of FIG. 4.

FIG. 6 is a timing chart showing the states of horizontal sync signals to be outputted from the CPU 1017 to the black and yellow video controlers 401 during the low speed mode. As previously described, these horizontal sync signals are obtained by periodically masking the BD signals 103 of the respective colors at suitable timing.

In FIG. 6, the reference numeral 601 designates a horizontal sync signal of black, and the reference numeral 603 denotes a horizontal sync signal of yellow. Both show the horizontal sync signals by negative logic.

In the present embodiment, the color which is the reference for the correction of misregister in the sub-scanning direction is black, and the writing-out position of yellow in the sub-scanning direction is corrected so as to be adjusted to the writing-out position of black in the sub-scanning direction. While in the following description, the correction of the misregister between black and yellow of the four colors will be described, correction similar to that for yellow can also be effected for magenta and cyan to thereby correct the misregister relative to black.

A method of correcting misregister of ¾ line by delaying the writing-out position of yellow by ¾ line relative to the writing-out position of black in the sub-scanning direction will hereinafter be described with reference to FIG. 6.

Of the horizontal sync signal 601 of black and the horizontal sync signal 603 of yellow, 601*b*, 601*d* and 603*a*, 603*c* indicated by broken lines show pulses of the BD signal 103 inputted to the CPU 1017 which are masked and not outputted to the video controller 401. These pulses are masked during the low speed mode, whereby image formation is effected at a speed double that during the standard mode.

The reference numeral 605 designates the cycle period of the horizontal sync signal of black, which is a cycleperiod 2T double the cycle period T of the horizontal sync signal during the standard mode. The reference numeral 607 denotes the phase difference between the horizontal sync signal of black and the horizontal sync signal of yellow. In the present embodiment, the phase difference is 3T/2 This is a phase difference of ¾ cycle period relative to the cycle period 2T of the horizontal sync signals 601 and 603.

In the low speed mode, the period during which the image formation of one line is effected and then the image formation of the next one (1) line is effected is 2T and thus, the positions of black and yellow in the sub-scanning direction deviate from each other by an amount corresponding to ¾ line during a time of 3T/2. Accordingly, by controlling the output timing of the horizontal sync signals as shown in FIG. 6, the misregister of ¾ line between black and yellow in the sub-scanning direction can be corrected.

The rotation controlling operation for the scanner motors when the correction of the misregister of ¾ line is effected as described above and the timing at which the horizontal sync signals during the low speed mode are masked will now be described with reference to FIGS. 7 and 8.

Figure 7:
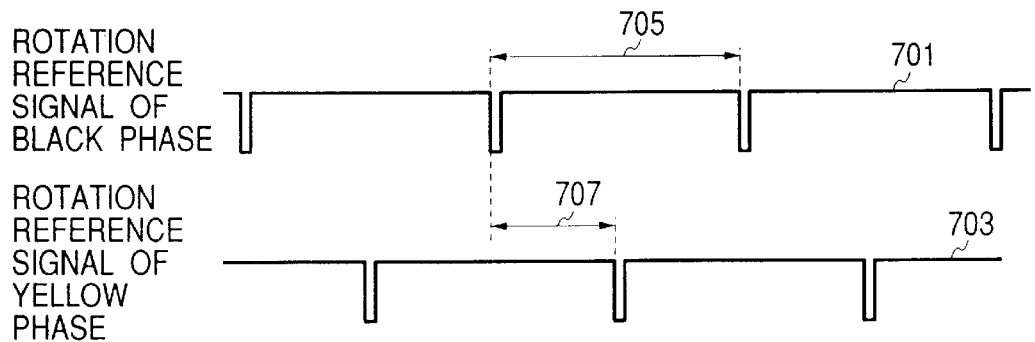
FIG. 7 is a timing chart showing the states of rotation reference signals by the circuit of FIG. 4.

FIG. 7 is a timing chart showing the states of the rotation reference signals outputting to the scanner motor controlling circuit of FIG. 5.

In FIG. 7, the reference numeral 701 designates a rotation reference signal of black for controlling the rotation of the black scanner motor, and the reference numeral 703 denotes a rotation reference signal of yellow for controlling the rotation, of the yellow scanner motor.

In the present embodiment, the scanner motors are controlled so that the horizontal sync signals (BD signals) and the rotation reference signals may be phase-synchronized with each other and therefore, the cycle period of the rotation reference signals and the cycle period of the horizontal sync signals are the same, and the phases of the horizontal sync signal and the rotation reference signal are equal for each color. Also, the reference numeral 705 designates the cycle period of the rotation reference signal of black, and this signal has the same cycle period T as that of the horizontal sync signals outputted to the video controllers during the standard mode. The reference numeral 707 denotes the phase difference between the rotation reference signals of black and yellow, and in FIG. 7, the phase difference is T/2.

Figure 8:
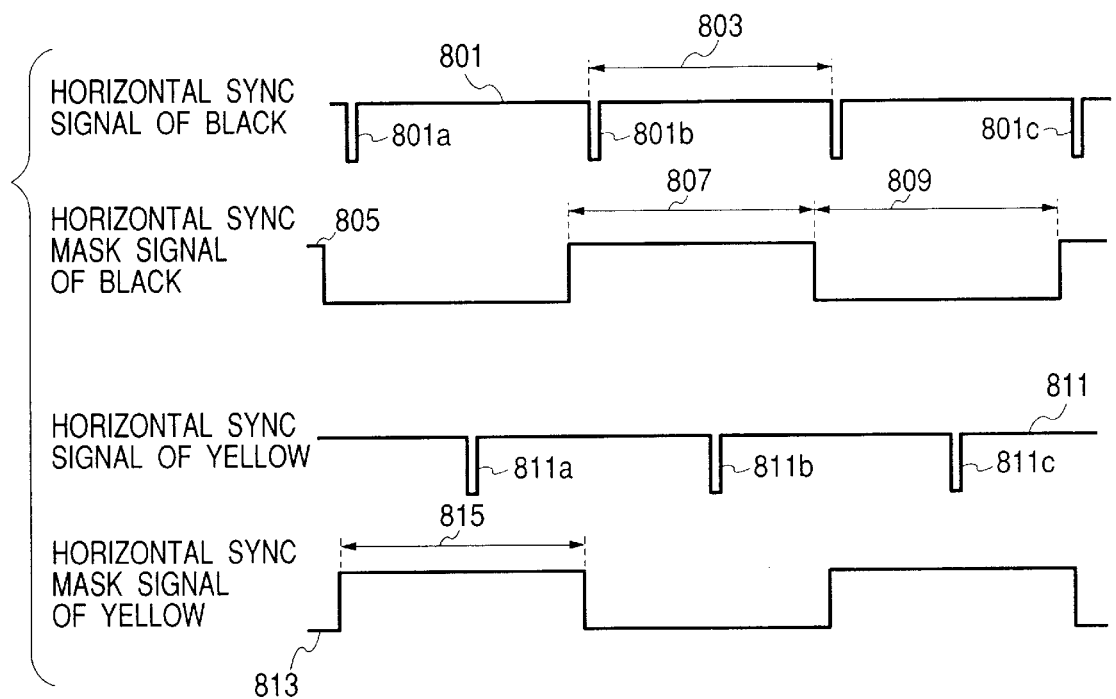
FIG. 8 is a timing chart for illustrating the controlling operation for horizontal sync signals by the circuit of FIG. 4.

FIG. 8 is a timing chart showing the states of the horizontal sync signals and mask signals during the low speed mode.

In FIG. 8, the reference numeral 801 designates the horizontal sync signal of black before masked. i.e., the BD signal 103K outputted from the BD 40K, and the reference numeral 811 denotes the horizontal sync signal of yellow before masked, i.e., the BD signal 103Y outputted from the BD 40Y. The reference numeral 803 designates the cycle period of the horizontal sync signal before masked, and this value is the same as the cycle period T of the rotation reference signal of black. The reference numeral 805 denotes the mask signal for masking the horizontal sync signal of black, and the reference numeral 813 designates the mask signal for masking the horizontal sync signal of yellow.

The masking period 807 and unmasking period 809 of the mask signal 805 are the same as the cycle period T of the horizontal sync signal 801 before masked, and the masking period and the unmasking period appear alternately. The masking period 815 of the mask signal 813 of yellow is also the same as the cycle period T like that of the mask signal 805 of black.

In the low speed mode, it is necessary to mask the pulses of the horizontal sync signals from the BD 40 once per twice, but when the horizontal sync signal 811 of yellow is masked by the mask signal 805 of black in FIG. 8, the pulse 811b is masked. Therefore, the misregister between black and yellow can only be corrected by an amount conforming to the phase difference between the pulses 801a and 811a, i.e., an amount corresponding to ¼ line.

So, in the present embodiment, when during the low speed mode, the misregister amount exceeds ½ line (here, it is ¾ line), the timing for masking the horizontal sync signal of black and the timing for masking the horizontal sync signal of yellow are made different from each other as shown in FIG. 8. Specifically, the horizontal sync signal of yellow is masked at a period for unmasking the horizontal sync signal of black, and the horizontal sync signal of black is masked at a period for unmasking the horizontal sync signal of yellow.

By doing so, the exposure by the rotary polygon mirror 903Y in the scanner unit 44Y of yellow is not effected on the same mirror surface as that at the timing whereat the scanner unit 44K of black exposes the drum 905K, but the exposure by the scanner unit 44Y of yellow is effected at the timing whereat the next mirror surface scans, i.e., the timing delayed by ½ line in the sub-scanning direction.

As described above, during the low speed mode, when the misregister amount exceeds ½ line, the timing for masking the horizontal sync signal is shifted by the cycle period T of the horizontal sync signal before masked, whereby the correction of misregister can be accomplished accurately. Also, when the misregister amount in the sub-scanning direction does not exceed ½ line, the horizontal sync signal of black and the horizontal sync signal of yellow are masked by the same mask signal and are outputted. Thus, the phases of the masking cycle periods of the horizontal sync signals are variably controlled.

In the present embodiment, as described with reference to FIGS. 7 and 8. the rotation phase of the scanner motor 106 is shifted by T/2 and the mask timing of the horizontal sync signals is shifted by T, the phases of the horizontal sync signals of black and yellow can be shifted by 3T/4. That is, in the low speed mode, the horizontal sync signals of black and yellow can be set to the phase relation shown in FIG. 6, and again in the low speed mode, the correction of ¾ line can be effected.

Figure 9:
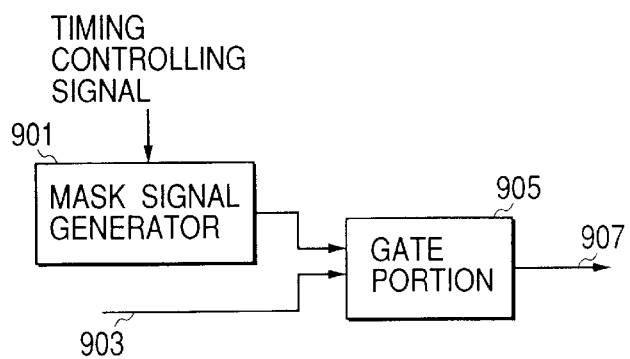
FIG. 9 shows the construction of a circuit for masking the horizontal sync signals.

FIG. 9 shows the construction of a circuit for producing horizontal sync signals in the CPU 1017.

In FIG. 9, a mask signal generator 901 generates a mask signal in conformity with a timing controlling signal outputted from other controlling portion in the CPU 1017 and outputs it to a gate portion 905. This timing controlling signal is outputted from other controlling portion in conformity with the misregister amount of other color relative to the reference color black. The reference numeral 903 designates a horizontal sync signal outputted from the scanner unit, and the gate portion 905 periodically masks the horizontal sync signal 903, as shown in FIG. 8, on the basis of the mask signal from the mask signal generator 901, and outputs a horizontal sync signal of which the cycle period has been changed to n times.

Also, the mask signal generating circuit is controlled so as not to generate the mask signal In the ordinary mode.

Figure 10:
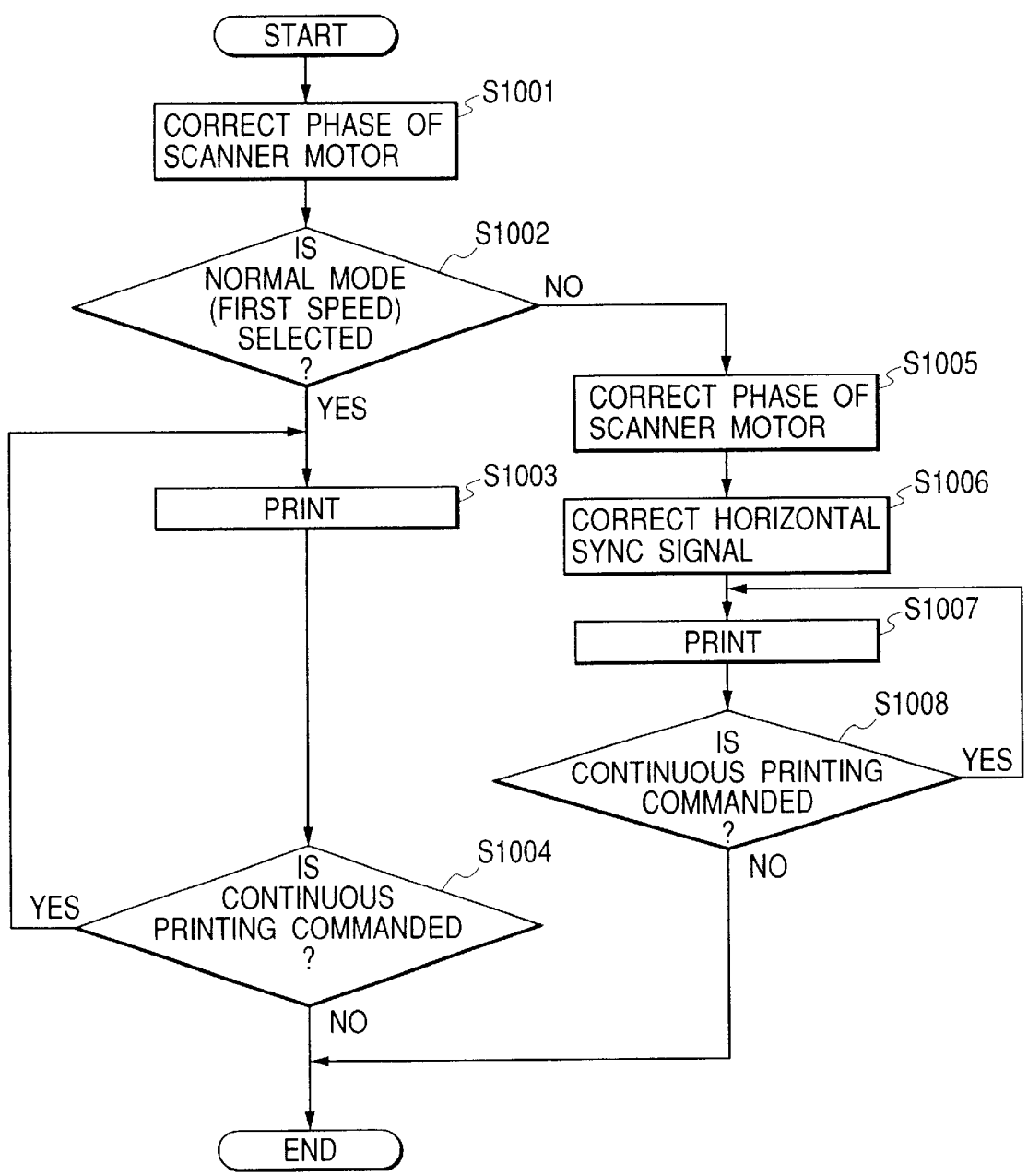
FIG. 10 is a flow chart for illustrating the image forming operation by an embodiment of the present invention.

FIG. 10 is a flow chart showing the controlling operation by the present embodiment for the scanner motor in the ordinary mode and the low speed mode.

When there is a printing command by the operation portion 1021 of FIG. 3, the printer controller 1001 instructs the printer engine 1016 to start printing. When instructed to start printing, the printer engine 1016 controls the phase of the scanner motor of each correction color on the basis of the misregister amount between the black image and the images of the other three colors detected by the misregister correcting process carried out discretely from the ordinary image forming mode (S1001). Next, the kind of the recording material to which the formed image is transferred is detected by a media sensor, not shown, and whether the image formation by the printing speed, i.e., the standard mode (first speed), should be effected or the image formation by the low speed mode should be effected is determined (S1002).

When the image formation by the standard mode is to be effected, the image formation is effected without the masking process for the horizontal sinc signals being intactly carried out (S1003), and when there are instructions for continuous printing, printing is continued (51004).

Also, when the transferring material is a special material such as thick sheet of paper or OHT and the image formation by the low speed mode is to be effected, the rollers of the fixing device are driven at a second speed lower than the speed in the standard mode. At the same time, on the basis of the result of the detection of misregister, the surface phase of the scanner motor is controlled to a phase for the correction of misregister when image formation is effected by the low speed mode (S1005). Then, as previously described, a mask signal conforming to the low speed mode is produced to thereby control the outputting of the horizontal sync signal (51006), and printing is effected (S1007). If there are instructions for continuous printing, printing is effected again (S1008).

By constructing so, misregister can be corrected highly accurately even when the printing speed is changed in conformity with the transferring material. Also, the scanner motor can be started by the printing command from the print controller, and even when the transferring material is not particularly designated in advance, the correction of misregister in the sub-scanning direction can be effected accurately without the first print time being sacrificed when printing is effected by the standard mode. Also, it is unnecessary to re-correct misregister in each printing when continuous printing is effected by the low speed mode and therefore, throughput can be improved.

While in the present embodiment, description has been made of a case where In the low speed mode, one time of exposure is effected per two times of scanning by the scanner unit, the present invention is also applicable to a case where image formation is effected at the other image forming speeds. That is, even when one time of exposure Is effected per n times of scanning and the image forming speed is changed, the mask signal is likewise generated so that only one of n pulses of the horizontal sync signal may be outputted, whereby the correction of misregister can be effected.

Also, the masking period of the mask signal is made the same as the cycle period T of the horizontal sync signal before masked, but if the horizontal sync signal can be masked at desired timing, the masking period may be any other length than T.

Generally, when a misregister amount less than one (1) line is to be corrected at 1/k (k being a natural number) line unit, the misregister amount between the reference color and the correction color is m/k (0<m<k, and m being a natural number) line, and when a portion of the horizontal sync signal of a cycle period T before masked is masked and the cycle period is made n times greater, the timing at which the rotation reference signal of the correction color is generated is set to a phase difference of $(T/k) \times$ (the remainder of $(n \times m)/k)$ relative to the reference color, and the timing at which the horizontal sync signal of the correction color is masked is set to timing shifted by $T \times$ (quotient of $(n \times m)/k)$ from the reference color.

A second embodiment of the present invention will now be described.

In the present embodiment, description will be made of a case when the present invention is applied to an apparatus in which drum units are scanned at a time by two laser beams to thereby form an image.

The construction of the apparatus is substantially similar to that of the aforedescribed embodiment shown in FIGS. 1 to 5. The difference of the present embodiment from the aforedescribed embodiment Is that in FIG. 2, the drums 905 are scanned at a time by two laser beams to thereby form an image.

The controlling operation by the present embodiment for the image forming timing during the low speed mode will now be described.

Figure 11:
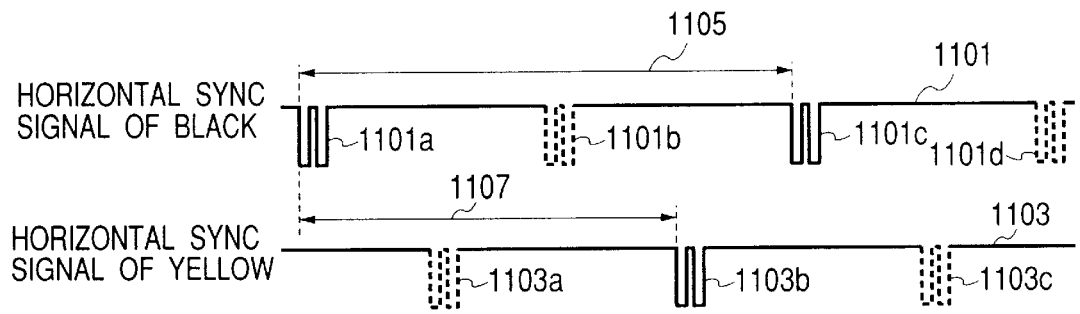
FIG. 11 is a timing chart showing the states of horizontal sync signals by a second embodiment of the present invention.

FIG. 11 is a timing chart showing the states of horizontal sync signals to be outputted from the CPU 1017 to the video controllers of black and yellow during the low speed mode.

In FIG. 11, the reference numeral 1101 designates a horizontal sync signal of black, and the reference numeral 1103 denotes a horizontal sync signal of yellow. Both show the horizontal sync signals by negative logic. In the present embodiment, exposure is effected by two laser beams at a time per one time of scanning and therefore, from the BD 40, two horizontal sync signals are obtained for each color substantially at the same timing. Herein, of the two horizontal sync signals obtained substantially at the same time, the horizontal sync signal first to be outputted Is called the first horizontal sync signal, and the horizontal sync signal second to be outputted is called the second horizontal sync signal.

In the present embodiment, the color which is the reference of the correction of misregister in the sub-scanning direction is black and the writing-out position of yellow in the sub-scanning direction is corrected to be adjusted to the writing-out position of black in the sub-scanning direction. While in the following description, the correction of the misregister between black and yellow of the four colors will be described, the misregister of magenta and cyan relative to black can also be corrected by effecting correction similar to that for yellow.

A method of correcting misregister of 3/2 lines by delaying the writing-out position of yellow by 3/2 lines relative to the writing-out position of black in the sub-scanning direction will hereinafter be described with reference to FIG. 11.

Of the horizontal sync signal 1101 of black and the horizontal sync signal 1103 of yellow, 1101b, 1101d and 1103a, 1103c indicated by broken lines designate the pulses of the BD signal 103 inputted to the CPU 1017 which are masked and are not outputted to the video controller 401. These pulses are masked during the low speed mode, whereby image formation is effected at a speed double that during the standard mode.

The reference numeral 1105 designates the cycle period of the horizontal sync signal of black, and it is a cycle period 2T double the cycle period T of the horizontal sync signals in the standard mode. The reference numeral 1107 denotes the phase difference between the horizontal sync signal of black and the horizontal sync signal of yellow. In the present embodiment, the phase difference is 3T/2. This is a phase difference of ¾ of the cycle period 2T of the horizontal sync signals 1101 and 1103.

In the low speed mode, the period from after the scanning of two lines is effected at a time until the image formation of the next two lines is effected is 2T and thus, the positions of black and yellow in the subscanning direction deviate by 3/2 lines from each other within a time of 3T/2. Accordingly, by controlling the output timing of the horizontal sync signals as shown in FIG. 11, the misregister of 3/2 lines between black and yellow in the sub-scanning direction can be corrected.

Figure 12:
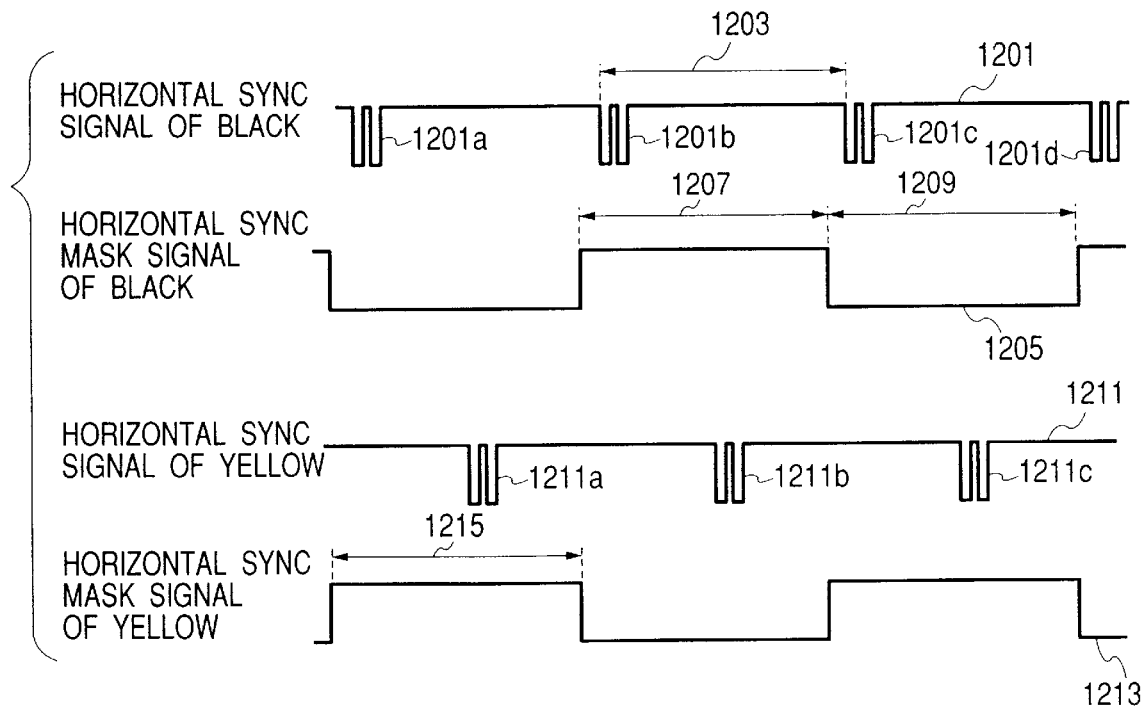
FIG. 12 is a timing chart for illustrating the controlling operation for the horizontal synch signals by the second embodiment of the present invention.
Figure 13:
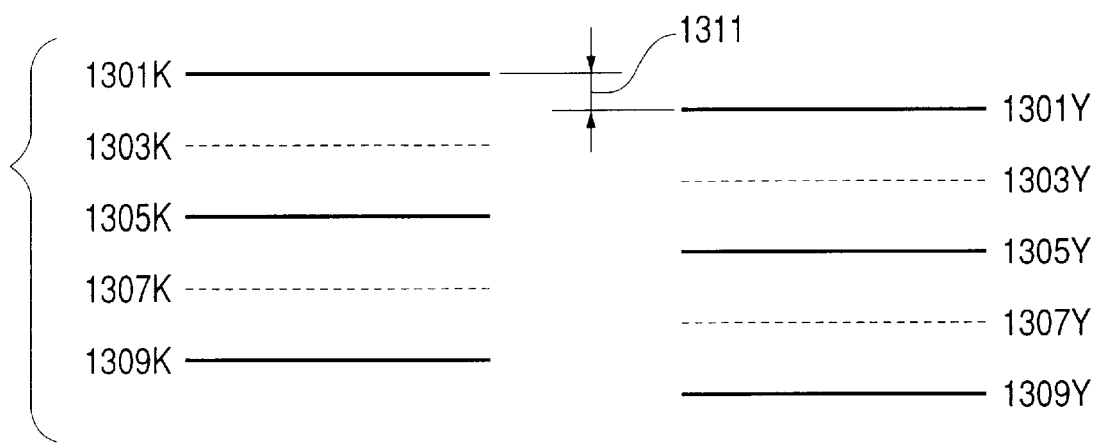
FIG. 13 shows the state of the misregister between images.
Figure 14:
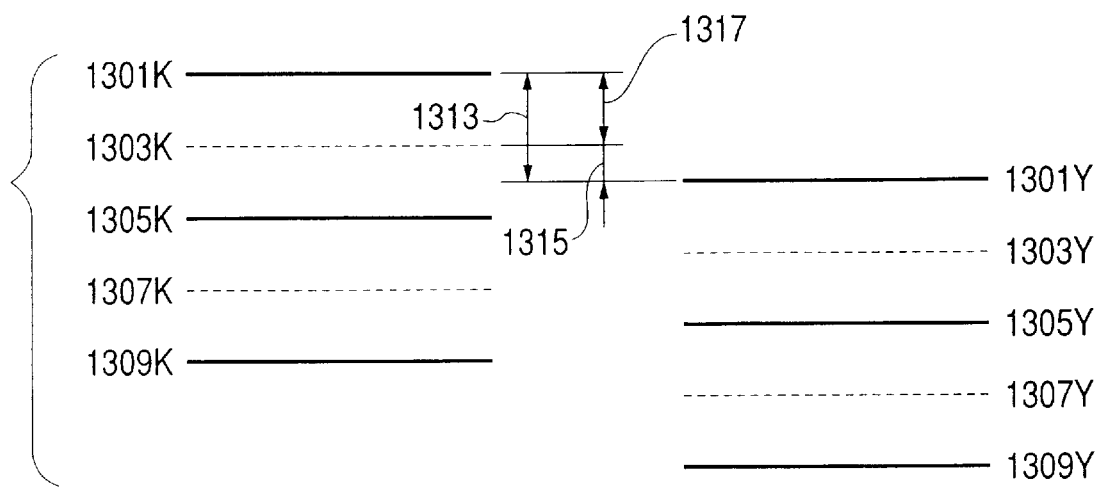
FIG. 14 shows the state of the misregister between images.

Reference is now had to FIGS. 7 and 12 to describe the rotation controlling operation for the scanner motor when the correction of misregister of 3/2 lines is effected as described above and the timing for masking the horizontal sync signals during the low speed mode.

FIG. 7 is a timing chart showing the states of rotation reference signals outputted to the scanner motor controlling circuit of FIG. 5 in the present embodiment.

In FIG. 7, the reference numeral 701 designates the rotation reference signal of black for controlling the rotation of the scanner motor of black, and the reference numeral 703 denotes the rotation reference signal of yellow for controlling the rotation of the scanner motor of yellow.

In the present embodiment, the scanner motor Is controlled so that the first horizontal sync signal of the aforementioned two horizontal sync signals and the rotation reference signals may be phasesynchronized with each other. The cycle period of the rotation reference signals and the cycle period of the horizontal sync signals are the same, and the phases of the horizontal sync signals and the rotation reference signals are equal for each color. Also, the reference numeral 705 designates the cycle period of the rotation reference signal of black, and this signal has the same cycle period T as that of the horizontal sync signal outputted to the video controller during the standard mode. The reference numeral 707 denotes the phase difference between the rotation reference signals of black and yellow, and in FIG. 7, it Is T/2.

FIG. 12 is a timing chart showing the states of the horizontal sync signals and mask signals during the low speed mode.

In FIG. 12, the reference numeral 1201 designates the first and second horizontal sync signals of black before masked, i.e., two BD signals 103K outputted substantially at a time from the BD 40K, and the reference numeral 1211 denotes the first and second horizontal sync signals of yellow before masked, i.e., two BD signals 103Y outputted substantially at a time from the BD 40Y. The reference numeral 1203 designates the cycle period of the first horizontal sync signal before masked, and this value is the same as the cycle period T of the rotation reference signal of black. The reference numeral 1205 denotes the mask signal for masking the first and second horizontal sync signals of black, and the reference numeral 1213 designates the mask signal for masking the first and second horizontal sync signals of yellow.

The masking period 1207 and unmasking period 1209 of the mask signal 1205 are the same as the cycle period T of the first and second horizontal sync signals 1201 before masked, and the masking period 1207 and the unmasking period 1209 appear alternately. Also, the masking period 1215 of the mask signal 1213 of yellow is the same as the cycle period T like that of the mask signal 1205 of black.

In the low speed mode, it is necessary to mask the pulses of the first and second horizontal sync signals from the BD 40 once per twice, but when the horizontal sync signals 1211 of yellow are masked by the mask signal 1205 of black in FIG. 12, the pulse 1211b is masked. Thus, the misregister between black and yellow can only be corrected by an amount conforming to the phase difference between the pulses 1201a and 1211a, i.e., ½ line.

So, in the present embodiment, when two (2) lines are to be scanned at a time, if during the low speed mode, the misregister amount exceeds one (1) line (here, 3/2 lines), the timing for masking the first and second horizontal sync signals of black and the timing for masking the first and second horizontal sync signals of yellow are made different from each other as shown in FIG. 12. Specifically, the first and second horizontal sync signals of yellow are masked during the period for unmasking the first and second horizontal sync signals of black, and the first and second horizontal sync signals of black are masked during the period for unmasking the first and second horizontal sync signals of yellow.

By doing so, the exposure by the rotary polygon mirror 903Y in the scanner unit 44Y of yellow is not effected on the same mirror surface as that in the timing at which the scanner unit 44K of black exposes the drum 905K, and at the timing whereat the next mirror surface scans, i.e., the timing delayed by one (1) line in the sub-scanning direction, the exposure by the scanner unit 44Y of yellow is effected.

As described above, during the low speed mode, when the misregister amount exceeds one (1) line, the timing for masking the horizontal sync signals is shifted by the cycle period T of the horizontal sync signals before masked, whereby the correction of misregister can be effected accurately.

In the present embodiment, as described with reference to FIGS. 7 and 12, the rotation phase of the scanner motor 106 is shifted by T/2 and the mask timing for the horizontal sync signals is shifted by T, whereby the phases of the horizontal sync signals of black and yellow can be shifted by 3T/2. That is, in the low speed mode, the horizontal sync signals of black and yellow can be set to the phase relation shown in FIG. 6, and in the low speed mode as well, the correction of 3/2 lines can be effected.

In the present embodiment, description has been made of a case where in the low speed mode, one time of exposure is effected per two times of scanning by the scanner unit, but as in the first embodiment, the mask signal is generated so that even when one time of exposure is effected per n times of scanning, one of n pulses of the horizontal sync signal may likewise be outputted, whereby the correction of misregister can be effected.

Also, the masking period of the mask signals is made the same as the cycle period T of the horizontal sync signals before masked, but if the horizontal sync signals can be masked at desired timing, the masking period may be any other length than T.

Generally, in an apparatus wherein p lines are scanned at a time in one time of scanning, when a misregister amount less than p lines is to be corrected at 1/k (k being a natural number) line unit and when the correction amount of misregister between the reference color and the correction color is m/k (0<m<(p×k), and m being a natural number) lines and a portion of the horizontal sync signal of the cycle period T before masked is masked and the cycle period is made n times greater, the timing for generating the rotation reference signal of the correction color is set to a phase difference of (T/(p×k)×(remainder of (n×m)/(p×k))) relative to the reference color, and the timing for masking the horizontal sync signal of the correction color is set to the timing shifted from the reference color by T×(quotient of (n×m)/(p×k)).

As described above, according to the present embodiment, even when the image forming speed is changed, the misregister between images can be corrected accurately and images of high definition can be obtained.

While the present invention has been described with respect to some preferred embodiments thereof, the present invention is not restricted to these embodiments, but it is apparent that various modifications and applications are possible within the scope of the appended claims.

What is claimed is:

1. An image forming apparatus comprising:
   a plurality of image forming means juxtaposed with one another and each having an image bearing member, light beam generating means for generating a light beam modulated in conformity with an image signal, a rotary polygon mirror for deflecting and scanning the light beam generated by said light beam generating means and writing an image onto said image bearing member, and light beam detecting means for detecting the light beam deflected and scanned by said rotary polygon mirror at a predetermined position on a scanning route;
   sync signal generating means for generating a horizontal sync signal based on a detection signal from said light beam detecting means;
   mask means for masking and outputting said horizontal sync signal;
   image signal outputting means for outputting said image signal to said light beam generating means in said plurality of image forming means in response to the horizontal sync signal outputted from said mask means:
   a plurality of rotation controlling means for rotatively driving the rotary polygon mirrors in said plurality of image forming means based on light beam detection signals from said light beam detecting means and a rotation reference signal;
   reference signal generating means for generating said rotation reference signal to said plurality of rotation controlling means: and control means for changing a phase of said rotation reference signal and a mask timing by said mask means based on a misregister amount among images formed by said plurality of image forming means to thereby correct the misregister amount among said images.

2. An image forming apparatus according to claim 1, wherein said image signal outputting means further outputs said image signal to said light beam generating means in response to a vertical sync signal, and said sync signal generating means also generates said vertical sync signal.

3. An image forming apparatus according to claim 2, wherein said control means changes an output timing of said vertical sync signal to thereby correct the misregister amount exceeding a predetermined amount, and changes the phase of said rotation reference signal and the mask timing to thereby correct the misregister amount equal to or less than said predetermined amount.

4. An image forming apparatus according to claim 3, wherein said predetermined amount is n line(s) (n being a natural number).

5. An image forming apparatus according to claim 1, wherein said image forming apparatus has a standard mode for forming an image at a first image forming speed, and a low speed mode for forming an image at a second image forming speed lower than said first image forming speed, and wherein said image signal outputting means, in said standard mode, outputs said image signal in response to said horizontal sync signal not masked by said mask means, and in said low speed mode, outputs said image signal in response to the horizontal sync signal outputted from said mask means.

6. An image forming apparatus according to claim 5, wherein said control means, in said standard mode, changes the phase of said rotation reference signal to thereby correct the misregister amount among said images, and in said low speed mode, changes the phase of said rotation reference signal and said mask timing to thereby correct the misregister amount among said images.

7. An image forming apparatus according to claim 5, further comprising mode setting means for setting said standard mode and said low speed mode in conformity with a kind of a transferring material to which the images formed by said plurality of image forming means are transferred.

8. An image forming apparatus according to claim 7, wherein said control means effects a phase control of said rotation reference signal corresponding to said standard mode in response to instructions to start image formation, and thereafter effects the phase control of said rotation reference signal or a change in said mask timing depending on a mode set by said mode setting means.

9. An Image forming apparatus according to claim 1, wherein said control means changes the phase of said rotation reference signal in response to instructions to start image formation, and thereafter changes the mask timing.

10. An image forming apparatus according to claim 1, wherein said image forming apparatus has a plurality of image forming modes differing in image forming speed from one another, and wherein said control means further sets the mask timing in conformity with said image forming modes.

11. An image forming apparatus according to claim 1, wherein said mask means masks said horizontal sync signal so as to output said horizontal sync signal every n pulses (n being a natural number).

12. An image forming apparatus according to claim 11, wherein when said misregister amount less than one line is corrected at 1/k (k being a natural number) line unit by said control means, and the misregister amount between an image formed by predetermined one of said plurality of image forming means and an image formed by other image forming means is m/k line (0<m<k, and m being a natural number), and the cycle period of said horizontal sync signal is T, said control means changes the phase of the rotation reference signal corresponding to said other image forming means by $(T/k)\times(\text{remainder of }(n\times m)/k)$ relative to the rotation reference signal corresponding to said predetermined image forming means, and changes the mask timing of the horizontal sync signal corresponding to said other image forming means by $(T)\times(\text{quotient of }(n\times m)/k)$ from the mask timing of the horizontal sync signal corresponding to said predetermined image forming means.

13. An image forming apparatus according to claim 1, wherein said light beam generating means generates p (p being 2 or greater integer) light beams, and said rotary polygon mirror writes an image of p lines onto said image bearing member by one time of deflection and scanning.

14. An image forming apparatus according to claim 13, wherein said mask means masks said horizontal sync signal so as to output said horizontal sync signal every n pulses (n being a natural number).

15. An image forming apparatus according to claim 14, wherein when said misregister amount 1 less than one line is corrected at 1/k (k being a natural number) line unit by said control means, and the misregister amount between an image formed by predetermined one of said plurality of image forming means and an image formed by other image forming means is m/k line (0<m<k, and m being a natural number), and the cycle period of said horizontal sync signal is T, said control means changes the phase of the rotation reference signal corresponding to said other image forming means by $(T/k)\times(\text{remainder of }(n\times m)/(p\times k))$ relative to the rotation reference signal corresponding to said predetermined image forming means, and changes the mask timing of the horizontal sync signal corresponding to said other image forming means by $T\times(\text{quotient of }(n\times m)/(p\times k))$ from the mask timing of the horizontal sync signal corresponding to said predetermined image forming means.

16. An image forming apparatus comprising:
scanning means for scanning a light beam to form an image;
detecting means for detecting the light beam scanned by said scanning means;
generating means for generating a sync signal based on an output of said detecting means;
mask means for periodically masking the output of said detecting means; and
masking controlling means for variably controlling a phase of a masking period of said mask means.

17. An image forming apparatus comprising:
a plurality of image forming units each including scanning means for scanning a light beam to form an image, detecting means for detecting the light beam scanned by said scanning means, generating means for generating a sync signal based on an output of said detecting means, and mask means for periodically masking the output of said detecting means; and
masking controlling means for variably controlling a phase of a masking period of said mask means in at least one of said plurality of image forming units.

18. An image forming apparatus according to claim 17, further comprising selecting means for selecting a first mode and a second mode for forming an image at a lower speed than in said first mode.

19. An image forming apparatus according to claim 17, wherein said plurality of image forming units are for forming images of different colors, said apparatus further comprising:

means for superimposing the images formed by said plurality of image forming units onto a common recording medium.

20. An image forming apparatus according to claim 17, wherein said light beam scanning means in each of said plurality of image forming units scans a plurality of light beams relative to the same photosensitive member.

21. An image forming apparatus according to claim 20, wherein said detecting means detect said plurality of light beams, and said masking means periodically masks a plurality of sync signals corresponding to said plurality of light beams.

22. An image forming apparatus according to claim 21, wherein said masking controlling means variably controls phases of masking periods of said plurality of sync signals corresponding to said plurality of light beams independently of one another.

23. An image forming method comprising:
a scanning step of scanning a light beam to form an image;
a detecting step of detecting the light beam scanned by said scanning step:
a generating step of generating a sync signal based on an output of said detecting step;
a masking step of periodically masking the output of said detecting step; and
a masking controlling step of variably controlling a phase of a masking period of said masking step.

* * * * *

UNITED STATES PATENT AND TRADEMARK OFFICE
CERTIFICATE OF CORRECTION

PATENT NO.   : 6,501,493 B2
DATED        : December 31, 2002
INVENTOR(S)  : Akihiro Fujimoto et al.

It is certified that error appears in the above-identified patent and that said Letters Patent is hereby corrected as shown below:

<u>Column 1,</u>
Line 15, "Image" should read -- image --.

<u>Column 3,</u>
Line 15, "is" should be deleted.

<u>Column 4,</u>
Line 9, "described:" should read -- described --.

<u>Column 5,</u>
Line 35, "Is" should read -- is --.

<u>Column 7,</u>
Line 20, "1017." should read -- 1017, --; and
Line 64, "controlers" should read -- controllers --.

<u>Column 8,</u>
Line 33, "3T/2" should read -- 3T/2. --.

<u>Column 10,</u>
Line 24, "In" should read -- in --.

<u>Column 11,</u>
Line 8, "In" should read -- in --;
Lines 12, 45 and 64, "Is" should read -- is --; and
Line 34, "(quotlent" should read -- (quotient --.

<u>Column 12,</u>
Line 53, "Is" should read -- is --; and
Line 56, "phasesynchronized" should read -- phase-synchronized --.

<u>Column 14,</u>
Lines 58 and 67, "means:" should read -- means; --.

<u>Column 16,</u>
Line 24, "1" should be deleted.

UNITED STATES PATENT AND TRADEMARK OFFICE
CERTIFICATE OF CORRECTION

PATENT NO. : 6,501,493 B2
DATED : December 31, 2002
INVENTOR(S) : Akihiro Fujimoto et al.

It is certified that error appears in the above-identified patent and that said Letters Patent is hereby corrected as shown below:

Column 18,
Line 7, "step:" should read -- step; --.

Signed and Sealed this

Seventh Day of October, 2003

JAMES E. ROGAN
*Director of the United States Patent and Trademark Office*